March 23, 1926. Re. 16,297
H. F. PARKER
CONTROL FOR ELECTRIC ELEVATORS
Original Filed April 25, 1921
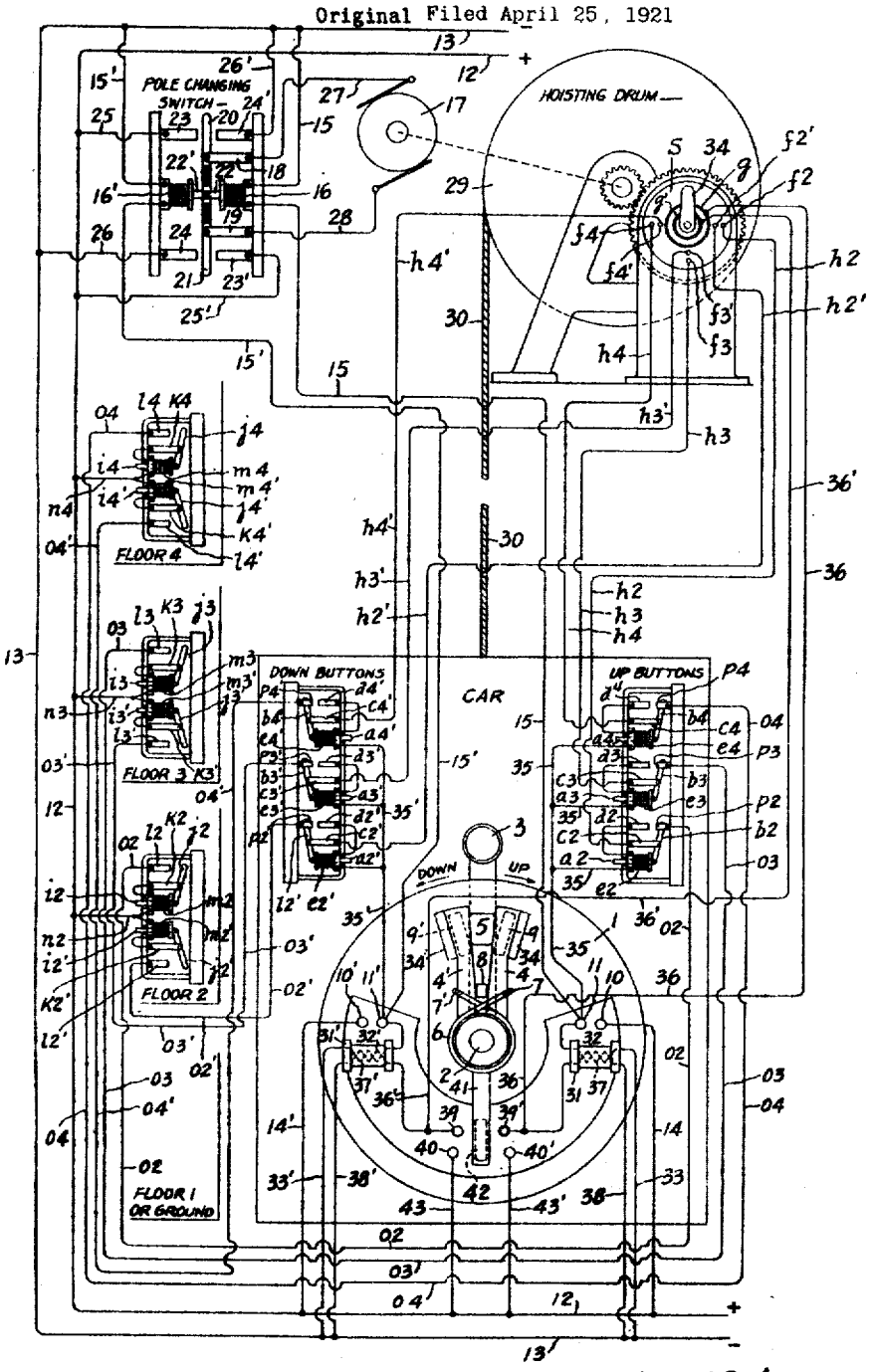
Humphrey F. Parker INVENTOR
BY Walter C. Bradley ATTORNEY Reissued Mar. 23, 1926. Re. 16,297

UNITED STATES PATENT OFFICE.

HUMPHREY F. PARKER, OF PHILADELPHIA, PENNSYLVANIA, ASSIGNOR TO OTIS ELEVATOR COMPANY, OF JERSEY CITY, NEW JERSEY, A CORPORATION OF NEW JERSEY.

CONTROL FOR ELECTRIC ELEVATORS.

Original application filed April 25, 1921, Serial No. 464,319. Renewed July 3, 1924. Original No. 1,506,380, dated August 26, 1924. Application for reissue filed November 13, 1925. Serial No. 68,922.

*To all whom it may concern:*

Be it known that I, HUMPHREY F. PARKER, a citizen of New Zealand, residing at Philadelphia, in the county of Philadelphia and State of Pennsylvania, have invented certain new and useful Improvements in Controls for Electric Elevators; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to a system and means for controlling electric elevators; and the invention has reference, more particularly, to a novel system and means of control whereby the elevator car may be caused to automatically stop in proper alignment with predetermined floor levels by virtue of the actuation or setting of secondary control means, which may be provided within the car alone, or both within the car and at each floor level; said secondary control means being adapted to cooperate with the master control switch within the car, which master switch is subject to the manual control of the car operator. Furthermore, this invention relates to a system and means for controlling electric elevator cars, whereby the starting of the car, either up on down in the shaft, is entirely and singly within the manual control of the car operator, but whereby the stopping of the car at predetermined points in its ascent or descent may be automatically attained if desired, The invention has for its principal object to provide a novel system and means for controlling electric elevators of the general characters above mentioned, which is adapted to eliminate the errors made by inexpert operators, who bring the car to a stop a few inches above or below the proper level, and to also prevent such operators failing to stop at a floor which a passenger has previously called for.

No fundamental change is contemplated in the driving or starting mechanism of the system, but only in the master control switch situated within the car itself. It is intended to retain the positive features of manual control, but to add to such an electrical mechanism which, upon being previously set, will interrupt the main driving or power circuit at predetermined points in the line of travel of the car. This electrical mechanism becomes operative upon the simultaneous fulfillment of two conditions, one condition being the closing of a manually actuated secondary switch, under the control of the operator within the car, or, if desired, under the control of a passenger on a floor level at which the latter desires the car to stop so that he may enter the same, and the other condition being the automatic closing of another secondary switch in the same circuit, which momentarily occurs as the car reaches the desired floor level.

Other objects of this invention, not at this time more particularly enumerated, will be clearly understood from the following detailed description of the same.

The invention is clearly illustrated in the accompanying drawing, in which the novel features and relations of the several mechanisms and electrical circuits employed are illustrated in diagrammatic form.

Referring now to the said drawing, the reference character 1 indicates a master control switch which is located within the elevator car, and which serves as the means whereby the operator may manually cause the closing or interrupting of the power circuit controlling the hoisting mechanism. This master control switch 1 comprises a central spindle 2 upon the exterior end of which is fixed a hand lever 3 whereby the same may be rotated. Loosely pivoted upon said spindle 2 are a pair of switch-arms, viz, an "up" switch-arm 4 and a "down" switch-arm 4′. The said switch arms 4 and 4′ are respectively arranged for movement in opposite directions, the same normally occupying initial released positions wherein they are respectively stopped against opposite sides of a fixed stop-member 5. A spring means 6, having arms 7 and 7′ which respectively engage said switch-arms 4 and 4′, serves to return said switch-arms to and to maintain the same in normal initial or released positions. Fixed upon said spindle is an actuating lever 8, the upper extremity of which enters between said switch-arms, when the latter are in normal initial or released positions, in such manner, that by swinging the hand-lever 3 in one direction or the other, said spindle 2 is rotated to engage one or the other of said switch-arms and thereby impel or swing the same into a desired circuit closing position. The switch-arm 4 carries a properly disposed contact-plate 9, and the switch-arm 4′ carries a like contact-plate 9′. Suitably supported in connection with said master control switch is a pair of separated contact-points 10 and 11, so located as to cooperate with said switch-arm 4; and also suitably supported in connection with said master control switch is another pair of separated contact points 10′ and 11′, so located as to cooperate with said switch-arm 4′.

The reference character 12 indicates the delivery or positive wire of an electric current supply circuit, and 13 indicates the return or negative wire of said supply circuit.

The primary circuit, operative through the master control switch for controlling the upward movement of the elevator car in its shaft, comprises wiring 14 leading from said delivery wire 12 to said contact-point 10, and wiring 15 leading from said contact-point 11 to said return wire 13. Operatively connected in the line of said wiring 15 is the "up" solenoid coil 16 of a pole changing switch mechanism. In principle said pole changing switch mechanism is constructed to pass an electric current through an electric motor 17, in either one or the opposite direction, so as to actuate, by means of said motor as a power source, the hoisting mechanism to cause either upward or downward travel of the elevator car in its shaft as may be desired. For the purpose of illustrating the arrangement and operation of my novel elevator control system, I have shown a pole changing switch in diagrammatic form, wherein there is provided a pair of pivot posts 18 and 19, to which are respectively pivoted contact arms 20 and 21 having their inner ends pivotally attached to the armature 22 of said solenoid coil 16. Fixed contact receiving members 23 and 24 are provided to respectively receive circuit closing engagement of said contact arms 20 and 21 to pass the circuit through the said motor 17 in direction to rotate the same to produce "up" movement of the hoisting mechanism; and, in like manner fixed contact receiving members 23′ and 24′ are provided to respectively receive circuit closing engagement of said contact arms 20 and 21 to reverse the direction of current flow through said motor 17 to produce "down" movement of said hoisting mechanism. Said pole changing switch also includes a "down" solenoid coil 16′ having an armature 22′ likewise pivotally connected with the inner ends of said contact arms 20 and 21. The contact receiving member 23 is connected by wiring 25 with said delivery wire 12 of the supply circuit, and the contact receiving member 24 is connected by wiring 26 with the return wire 13 of said supply circuit; in like manner, the contact receiving member 23′ is connected with said delivery wire 12 by the wiring 25′, and the contact receiving member 24′ by the wiring 26′ with the return wire 13. The pivot post 18 is connected by wiring 27 with the positive pole or brush of said motor 17, while the negative pole or brush of the latter is connected by wiring 28 with said pivot post 19. It will be understood that I do not limit my invention to the use of any particular kind of pole-changing switch, but may employ any type thereof which is commonly used or found desirable for electric elevator systems. When the operator moves the hand lever 3 to the right, the actuating lever 8 engages the switch-arm 4 swinging the same to the right and thereby carrying the contact-plate 9 into bridging contact with the contact-points 10 and 11, thus completing the primary control circuit through the wires 14 and 15 and energizing the solenoid coil 16, whereby the armature 22 is actuated to throw the contact arms 20 and 21 respectively into circuit closing engagement with said contact receiving members 23 and 24, thus completing a power circuit through the motor 17 in one direction, whereby the current enters by way of the wires and parts 25, 23, 20, 18 and 27, and returns by way of the wires and parts 28, 19, 21, 24 and 26, thus causing the hoisting drum 29 to be driven in a direction which will wind up the cable 30, and produce upward movement of the elevator car in the shaft.

The primary circuit, operative through the master control switch for controlling the downward movement of the elevator car in its shaft, comprises wiring 14′ leading from said delivery wire 12 to said contact-point 10′, and wiring 15′ leading from said contact-point 11′ to said return wire 13. Operatively connected in the line of said wiring 15′ is said "down" solenoid coil 16′ of said pole changing switch. When the operator moves the hand lever 3 to the left, the actuating lever 8 engages the switch-arm 4′ swinging the same to the left and thereby carrying the contact-plate 9′ into bridging contact with the contact points 10′ and 11′, thus completing the primary control circuit through the wires 14′ and 15′ and energizing the solenoid coil 16′, whereby the armature 22′ is actuated to throw the contact arms 21 and 20 respectively into circuit closing engagement with said contact receiving members 23′ and 24′, thus completing a power circuit through the motor 17 in a reverse direction, whereby current enters by way of the wires and parts 25′, 23′, 21, 19 and 28, and returns by way of the wires and parts 27, 18, 20, 24′ and 26′, thus causing the hoisting drum 29 to be driven in a direction which will unwind the cable 30, and produce downward movement of the elevator car in the shaft.

From the description, so far as it has proceeded, it will be apparent that the manipulation of the master switch by the operator within the car, will open or close a power circuit controlling the mechanical hoisting mechanism so that the car may be caused to ascend or descend its shaft at will.

I will now proceed to describe those features of my invention whereby the automatic accurate stopping of the car at a predetermined desired floor level may be attained. This purpose is served by means for holding the switch-arms 4 and 4′ in their respective primary control circuit closing positions, with which are associated secondary electric control circuits for releasing the holding means of said switch-arms at proper times; said secondary control circuits being two in number, one serving the ascending travel and the other the descending travel of the car. Said secondary control circuits each include, essentially, means for releasing the switch-arm holding means operative on the closing of the secondary control circuit including the same, and two independent circuit closing means arranged in series, one adapted to be manually operated prior to the arrival of the car at the desired stoppage point, and the other being adapted to be closed, when the car arrives at the desired stoppage point, by automatic means synchronized with the car movement, whereby operative closing of the circuit depends upon the joint closing of the thus interrelated gaps in said circuit. The preferred form of the manually actuated secondary circuit closing means comprises a set of button devices positioned within the car and arranged in parallel, one for each floor, the same being subject to selective operation according to the floor level at which it is desired that the car should stop. As shown in the drawings, the said secondary circuit closing means may also include, in proper electrical combination with the car button devices, a series of floor button devices on each floor, which are subject to manual actuation, and which when set prior to the arrival of the car will cooperate with the automatic circuit closing means to cause the car to stop at the destined floor to take on the passenger desiring to enter the car therefrom. It will be understood, that the invention would include the use of such floor buttons when the car buttons were omitted, if such an arrangement should be desired, and vice versa.

Referring again to the drawings, said secondary control circuits and the included and associated devices above mentioned will now be described in detail. The reference character 31 indicates a magnetic device for holding the switch-arm 4 in operative position with its contact-plate 9 bridging the contact-points 10 and 11. In the form shown in the drawing this magnetic device possesses an energizing coil or winding 32, which is interconnected with said contact-point 11 and said return wire 13 by the wiring 33, so that, when the switch-arm 4 is in operative position, a circuit through said coil or winding 32 will be established through the wires and parts 14, 10, 9, 11 and 33, whereby said magnetic device will cooperate with an armature-piece 34 carried by said switch-arm 4, to thus hold the latter in operative primary control circuit closing position against the tension of the spring 6 and its arm 7. Situated within the car are a series of "up" button devices corresponding in number to the number of floor levels above ground which the elevator car serves. These "up" button devices constitute the selective and manually operable circuit closing means within the car for the secondary control circuit serving the ascending travel of said car. The "up" button device which serves for the automatic stop at the second floor level comprises a push-button $a^2$ which controls the movement of a contact-arm $b^2$ which is pivotally mounted on a post $c^2$, and which is engageable, when actuated, with a contact receiving member $d^2$. Said push-button $a^2$, when actuated, remains in operative position until released by some suitable form of releasing means, such as the magnetic device or solenoid $e^2$. The "up" button device which serves for the automatic stop at the third floor level comprises a push-button $a^3$, contact-arm $b^3$, pivot post $c^3$, contact receiving member $d^3$ and solenoid $e^3$. Likewise, the "up" button device which serves for the automatic stop at the fourth floor level comprises a push-button $a^4$, contact-arm $b^4$, pivot post $c^4$, contact receiving member $d^4$ and solenoid $e^4$.

The device which constitutes the automatic circuit closing means for the secondary control circuit serving the ascending travel of the elevator car, and which is synchronized with the car movement so as to operate only when the car reaches each floor level, comprises a switch-plate S having at properly spaced intervals about its center a series of "up" contact points, corresponding in number to the number of floor levels, above ground, served by the car; said contact points being $f^2$, $f^3$ and $f^4$ respectively corresponding to the respective floor levels. Cooperating with said contact points, and electrically separated therefrom, is an annular contact member $g$. Rotatably associated with said switch plate S, and operated by suitable transmission mechanism from the hoisting drum or other running gear governing the car movement, so as to be properly synchronized with the latter, is a contact brush 34 which, at proper times, will bridge the gaps between said contact points $f^2$, $f^3$, and $f^4$ and said contact member $g$.

The secondary control circuit, which governs the automatic stops of the car during its ascending travel, is established through said "up" button devices and said automatic circuit closing means, as follows:

The solenoid together with the contact receiving member of each button device is connected by wiring 35 with the contact point 11 of the master switch. The pivot-post $c^2$ is connected by wiring $h^2$ with the contact point $f^2$ of the switch plate S; in like manner, the pivot-post $c^3$ is connected by wiring $h^3$ with the contact-point $f^3$; and the pivot-post $c^4$ is connected by wiring $h^4$ with the contact point $f^4$. The contact member $g$ is connected by wiring 36 with one terminal of a reversely wound neutralizing or deenergizing coil 37 with which said magnetic device 31 is provided, the opposite terminal of said deenergizing coil 37 being connected to the return wire 13 by the wiring 38.

When it is desired to include in my novel elevator control system means for operating the secondary control circuit from the floor levels, whereby a prospective passenger awaiting the arrival of the ascending elevator car at a certain floor may actuate a manual secondary control circuit closing means so that the approaching car is automatically caused to stop at the desired floor, there is provided at each floor level an "up" button device electrically interrelated with the above described secondary control circuit. The "up" button device which serves for the automatic stop at the second floor level comprises a push-button $i^2$ which controls the movement of a contact-arm $j^2$ which is pivotally mounted on a post $k^2$, and which is engageable, when actuated, with a contact receiving member $l^2$. Said push-button $i^2$, when actuated, remains in operative position until released by some suitable form of releasing means, such as the magnetic device or solenoid $m^2$. The "up" button device which serves for the automatic stop at the third floor level comprises a push-button $i^3$, contact-arm $j^3$, pivot-post $k^3$, contact receiving member $l^3$ and solenoid $m^3$. Likewise, the "up" button device which serves for the automatic stop at the fourth floor level comprises a push-button $i^4$, contact-arm $j^4$, pivot-post $k^4$, contact-receiving member $l^4$ and solenoid $m^4$. These button devices are connected with the secondary control circuit governing the stops during the ascending travel of the car, as follows:

The solenoid together with the pivot post of each button device are respectively connected with the delivery wire 12 by the respective wires $n^2$, $n^3$ and $n^4$. The contact receiving member $l^2$ is connected by wiring $o^2$ with a contact point $p^2$ associated with the "up" button devices within the car, and with which the contact-arm $b^2$ is in normal initial engagement, so that when the floor "up" button is actuated the current passes through the contact-arm $b^2$, pivot-post $c^2$, and thence through the wire $h^2$ to the automatic secondary circuit closing device whereby the said circuit is finally closed through said neutralizing or deenergizing coil 37 back to the return wire. In like manner, the contact receiving member $l^3$ is connected by wiring $o^3$ with a contact point $p^3$; and the contact receiving member $l^4$ is connected by wiring $o^4$ with the contact point $p^4$.

I have thus described the complete secondary circuit controlling the automatic stopping of the elevator car during its ascending travel. It will be understood that a similar secondary control circuit, employing similar devices for actuating the operative closing of the same, is provided for controlling the automatic stopping of the elevator car during its descending travel. In order to avoid repetition of description I have designated the wiring and parts of said latter or descending secondary control circuit as shown on the drawing, with the same reference numerals and characters to which, for the purpose of distinguishing the same from the ascending secondary control circuit and its parts, I have affixed the prime character.

I will now describe the operation of my system. Assuming that the elevator car is to be operated to cause its ascent. The operator throws over the hand-lever 3 to carry the switch-arm 4 into operative position to close the primary control circuit by bridging the contact points 10 and 11. In so doing the circuit through the energizing coil 32 of the magnetic detent device 31 is likewise completed whereby the switch-arm 4 is held in operative position. Assuming, furthermore, that a passenger, having entered the car at the ground floor announces his desire to leave the same at the third floor level, the operator thereupon pushes in the "up" button $a^3$. This inward movement of the button $a^3$ throws the contact arm $b^3$ into contact with the contact receiving member $d^3$, thereby closing the manually controlled gap in the secondary control circuit, so that the current may flow from the delivery wire 12 through the wires and parts 14, 10, 11, 35, $e^3$, $d^3$, $b^3$, $c^3$ and $h^3$ to the contact point $f^3$ of the switch-plate S. Now as the car ascends the shaft, the brush 34 of the switch-plate S will move toward the contact point $f^3$ at the same rate as the car moves toward the floor-level 3. By the time the car reaches the floor level 3 said brush 34 will contact with the contact-point $f^3$, and will bridge the current passing through the secondary control circuit over to the contact member $g$, and thence through the wire 36 to the neutralizing or deenergizing coil 37 of the detent device 31, the circuit being completed through the wire 38 to the return wire 13 of the supply circuit. It will thus be apparent that the two gaps in the secondary control circuit are only closed to render said circuit operative at the moment the car reaches the third floor level. When said secondary control circuit is thus completed, the current passing through the deenergizing coil 37 of the detent device at once neutralizes or balances the effect of the current through the coil 32 so that the detent device is neutralized, whereby the switch-arm 4 is released so that the spring 6 and its arm 7 returns the same to normal initial position and breaks the primary control circuit, resulting in the automatic stopping of the car exactly at the third floor level. Of course, it will be understood that the timing of the automatic secondary circuit closing means may be so arranged as to allow for the timely operation of the usual braking mechanism to overcome the momentum of the car so that the ultimate point at which the car comes to rest will be in proper alinement with the floor level. The completion of the secondary control circuit also energizes the solenoid $e^3$ whereby the push-button $a^3$ and associated parts are released from operative positions and returned to normal initial positions. It will be understood that the "up" buttons $a^2$, $a^3$, and $a^4$, are selectively operable, but that they may all be actuated, or any plurality of the same may be actuated, so that any predetermined sequence of automatic stops of the car may be caused during its ascending travel. It therefore follows that the operator may set as many of the "up" buttons as he may be called upon to do before leaving the ground floor level, and that the car will make the stops at floor levels successively in accordance with actuation of the buttons corresponding to such floors.

Assuming now that a passenger standing at the second floor level awaits an ascending car desiring to enter the same for travel to floors above, he may cause the car to automatically stop at said second floor to take him on, by actuating the "up" button $i^2$ which throws the arm $j^2$ into engagement with the contact receiving member $l^2$ so that the secondary control circuit is partially closed from the delivery wire 12 through the wires and parts $n^2$, $m^2$, $k^2$, $l^2$, $o^2$, $p^2$, $b^2$, $c^2$, $h^2$, to the contact point $f^2$ of the switch plate S. Now as the car ascends the shaft, the brush 34 of the switch plate S will move toward the contact point $f^2$ as the car approaches the second floor level, so that, as the car reaches said level, the brush 34 will engage the contact point $f^2$ and will bridge the current passing through the secondary control circuit over to the contact member $g$, and thence through the wire 36 to the neutralizing coil 37 of the detent device 31, the circuit being completed through the wire 38 to the return wire 13 of the supply circuit, thereby rendering the said secondary control circuit effective to release the switch-arm 4 to break the primary control circuit, and to consequently automatically stop the car at the second floor level.

It will be understood that the actuation of the secondary control circuit related to the descending travel of the car may be carried out in an exactly similar manner through the manipulation of either the car or floor "down buttons" and the operation of the corresponding devices of said circuit, so that the car may be automatically stopped at any desired floor level during its descent.

In order to prevent the operative closing of the switch-arm 4 should the switch-arm 4′ be in circuit closing position, I provide a means for releasing the engaged switch-arm 4′ before the switch-arm 4 reaches its circuit closing position. This means comprises a pair of separated contact points 39 and 40, and a depending arm 41 fixed to and movable by said spindle 2, said arm 41 having a contact-plate 42. Said contact point 39 is electrically connected with the wiring 36′, while the contact-point 40 is connected by the wire 43 with the delivery wire 12. In operation when the hand-lever 3 is operated to throw over the switch-arm 4, the arm 41 is moved in the opposite direction so as to carry the contact-plate 42 into bridging engagement with the contact-points 39 and 40, before the movement of the switch-arm 4 is completed. As a consequence of this operation a circuit is established through the neutralizing coil 37′ by way of the wires and parts 43, 40, 39, 36′ and 38′, so that the coil 32′ is neutralized and the switch-arm 4′ released from operative position prior to the complete closing movement of said switch-arm 4. In like manner, a similar arrangement of wires and parts serving the neutralizing coil 37 is provided (the same being denoted in the drawings by similar reference-numerals having appended prime signs), whereby the switch-arm 4 is released, should it be in circuit closing position, prior to the closing of the switch-arm 4′ should the same be actuated under such conditions.

The principles of this invention will be fully understood from the above description of the various devices and parts, together with their novel arrangement and interrelation, as well as from the manner of its operation as above described. I am aware, however, that in practice various changes may be made in the detail construction of the various parts, especially is this so with respect to the manually operable closing means for the secondary circuits, to the automatic closing means for said secondary circuits, and to the detent means for the switch-arms 4 and 4′, consequently it will be understood that all alterations or variations of such parts, which do not alter the general principles of operation of this invention as a whole or as to subcombinations thereof, may be made without departing from the scope of this invention as expressed by and in the appended claims.

I claim:

1. A controlling means for a guided movable body comprising a power circuit, a master switch on the body to control said power circuit, means under the manual control of an operator within the body for closing said master switch to set the body in motion, means for holding said master switch closed after actuation, means for releasing said holding means, and selective means corresponding to predetermined stopping points for automatically actuating said releasing means whereby the body is automatically stopped at desired predetermined points in the line of its travel independently of the operator within the body.

2. A controlling means for a guided movable body comprising a power circuit, a master switch on the body to control said power circuit, means under the manual control of an operator within the body for closing said master switch to set the body in motion, means for holding said master switch closed after actuation, means for releasing said holding means whereby said master switch is opened to stop the movement of the body, and selective means for actuating said releasing means which are partially manually operable and partially automatically operable, said selective means corresponding to predetermined stopping points in the line of travel of the movable body.

3. The combination with a guided movable body of an electrical controlling circuit, a switch on said body manually operable for closing said circuit, means holding said switch in circuit closing position, and selective means for actuating the release of said switch holding means to stop said body at one or more predetermined points in the line of its travel, said selective means comprising a manually operable circuit closer to be actuated prior to the arrival of the body at a selected stopping point and an automatic circuit closer actuated upon the arrival of the body at said selected stopping point.

4. The combination with a guided movable body of an electrical controlling circuit, a switch on said body connected in said circuit, means for manually closing said switch to set the body in motion, means for holding said switch closed to maintain the body in motion, and a secondary electrical circuit for releasing said switch holding means, a manual circuit closing means included in said secondary circuit, and an automatic circuit closing means included in said secondary circuit, said automatic circuit closing means being timed to operate synchronously with the arrival of said body at predetermined stopping points in the line of its movement, said manual and automatic closing means being arranged in series in said secondary circuit, the selection of the desired one of several points for automatic stopping of the body being determined by the actuation of said manual secondary circuit closing means prior to the arrival of the body at such point.

5. The combination with a guided movable body of an electrical controlling circuit, a switch on said body connected in said circuit, means for manually closing said switch to set the body in motion, means for holding said switch closed to maintain the body in motion, a secondary electrical circuit for releasing said switch holding means, a selective manual circuit closing means on said body included in said secondary circuit, a manual circuit closing means located at each fixed stopping point for said body also included in said secondary circuit, and an automatic circuit closing means included in said secondary circuit, said automatic circuit closing means being timed to operate synchronously with the arrival of said body at each stopping point therefor, one or more automatic stops of said body at predetermined stopping points being obtained by the selective actuation of the manual secondary circuit closing means on said body or by the actuation of the manual secondary circuit closing means located at said predetermined stopping points.

6. The combination with a guided movable body of an electrical controlling circuit, a switch on said body connected in said circuit, means for manually closing said switch to set the body in motion, means for holding said switch closed to maintain the body in motion, a secondary electrical circuit for releasing said switch holding means, a manual circuit closing means located at each fixed stopping point for said body included in said secondary circuit, and an automatic circuit closing means also included in said secondary circuit, said automatic circuit closing means being timed to operate synchronously with the arrival of said body at each stopping point therefor, automatic stops at a desired stopping point of said body being obtained by the actuation of said manual circuit closing means located at such points prior to the arrival of the body.

7. The combination with a guided movable body of electrical controlling circuits, one of said circuits controlling movement of said body in one direction, the other of said circuits controlling movement of said body in the opposite direction, a switch means on said body having a switch-arm for each of said controlling circuits, means for normally holding said switch-arms out of service, means for selectively and manually moving said switch-arms into service, a detent means for each switch arm to hold the same in service, and a secondary circuit for releasing each detent means, a manual circuit closing means and an automatic circuit closing means connected in series in each secondary circuit, said automatic circuit closing means of each secondary circuit being timed to operate synchronously with the arrival of said body, at each stopping point.

8. The combination with a guided movable body of electrical controlling circuits, one of said circuits controlling movement of said body in one direction, the other of said circuits controlling movement of said body in the opposite direction, a switch means on said body having a switch-arm for each of said controlling circuits, means for normally holding said switch-arms out of service, means for selectively and manually moving said switch-arms into service, a detent means for each switch arm to hold the same in service, and a secondary circuit for releasing each detent means, a manual circuit closing means and an automatic circuit closing means connected in series in each secondary circuit, said automatic circuit closing means of each secondary circuit being timed to operate synchronously with the arrival of said body at each stopping point, additional independent circuits for releasing said detent means, and means for closing one or the other of said latter circuits operating to assure a release of one switch-arm before the other switch-arm can be moved into service.

9. The combination with a guided movable body of an electrical controlling circuit, a switch on said body connected in said circuit, means for manually closing said switch, detent means for holding said switch closed, electrically actuated means for releasing said detent means, an automatic switch means in circuit with said detent releasing means, said automatic switch means being synchronized with the movement of said body whereby it is successively operative as said body arrives at each fixed stopping point established therefor, and a plurality of manually and selectively operable switch means on said body in circuit with said automatic switch means, said manually operable switch means corresponding respectively with the successive circuit closing operations of said automatic switch means.

10. The combination with a guided movable body of an electrical controlling circuit, a switch on said body connected in said circuit, means for manually closing said switch, detent means for holding said switch closed, electrically actuated means for releasing said detent means, an automatic switch means in circuit with said detent releasing means, said automatic switch means being synchronized with the movement of said body whereby it is successively operative as said body arrives at each fixed stopping point established therefor, a plurality of manually and selectively operable switch means on said body in circuit with said automatic switch means, said manually operable switch means corresponding respectively with the successive circuit closing operations of said automatic switch means, and a manually operable switch means at each fixed stopping point established for said body also in circuit with said automatic switch means, and the same cooperating with the respective circuit closing operations of the latter according to their location.

11. The combination with a guided movable body of an electrical controlling circuit, a switch on said body connected in said circuit, means for manually closing said switch, detent means for holding said switch closed, a secondary circuit, electrically actuated detent releasing means in said secondary circuit, said secondary circuit having two electrical gaps in series, manual means for closing one gap, automatic means for closing the other gap, said automatic means being timed to operate synchronously with the arrival of the body at a predetermined stopping point in its line of movement, and said gaps being arranged in series so that a partial closing of said secondary circuit may be accomplished prior to the arrival of said body at said stopping point by the manual closing of one gap whereby the automatic closing of the second gap completes said circuit at the moment the body arrives at said stopping point and thus releases the switch of said main controlling circuit thereby stopping the body at said predetermined stopping point.

12. A control system for an elevator car comprising, a plurality of control means, one for each of a plurality of landings, operable to cause the stopping of the car only at the landings for which control means are operated, and a switch, said switch being manually operable to cause the starting of the car after each stop.

13. A control system for an elevator car comprising, a plurality of stop controls, each for a different landing, for controlling only the stopping of the car, start control means operated only from within the car, and car actuating and stopping mechanism responsive to said stop controls to stop the car only at the landings for which stop controls are operated and to said start control means to start the car.

14. A control system for an elevator car comprising, a plurality of stop controls, each for a different landing, for controlling only the stopping of the car, start control means, and car actuating and stopping mechanism responsive to said stop controls to stop the car only at the landings for which stop controls are operated and to said start control means to start the car.

15. A control system for an elevator car comprising, a plurality of stop controls, each for a different landing, for controlling only the stopping of the car, a start control carried by the car, and car actuating and stopping mechanism responsive to said stop controls to stop the car only at the landings for which stop controls are operated and to said start control to start the car.

16. A control system for an elevator car comprising, a plurality of stop controls, each for a different landing, for controlling only the stopping of the car, a start control, and car actuating and stopping mechanism responsive to said stop controls to stop the car only at the landings for which stop controls are operated and to said start control after each and every stop to start the car.

17. A control system for an elevator car comprising, a plurality of stop controls, each for a different landing, for controlling only the stopping of the car, start control means operated from within the car, and car actuating and stopping mechanism responsive to said stop controls to stop the car at the landings for which stop controls are operated and only to said start control means to start the car.

18. A control system for an elevator car comprising, a plurality of stop controls, each located at a different landing, for controlling only the stopping of the car, a start control carried by the car, and car actuating and stopping mechanism responsive to said stop controls to stop the car only at the landings for which stop controls are operated and to said start control to start the car.

19. A control system for an elevator car comprising, a plurality of stop switches carried by the car, each for a different landing, start control switching mechanism carried by the car, and car actuating and stopping mechanism responsive to said stop switches to stop the car at the landings corresponding to the stop switches operated and to said start control switching mechanism to start the car after each and every stop.

20. A control system for an elevator car comprising, a plurality of stop switches carried by the car, each for a different landing, start control switching mechanism, and car actuating and stopping mechanism responsive to said stop switches to stop the car at the landings corresponding to the stop switches operated and to said start control switching mechanism to start the car after each and every stop.

21. A control system for an elevator car comprising, a plurality of control means, one for each of a plurality of landings, operable to cause the stopping of the car at the landings for which the control means are operated, and only one control means for causing the starting of the car, said one control means being manually operable.

22. A control system for an elevator car comprising, a plurality of control means, one for each of a plurality of landings, operable from without the car to cause the stopping of the car at the landings for which the control means are operated, and only one control means for causing the starting of the car, said one control means being operable only from within the car.

23. A control system for an elevator car comprising, a stop control for a landing, said stop control being carried by the car, an additional stop control located at said landing, a start control separate from said stop controls, and car actuating and stopping mechanism responsive to said start control to start the car and to either of said stop controls to stop the car only at said landing.

24. A control system for an elevator car comprising, a plurality of stop controls carried by the car, each for a different landing, a plurality of additional stop controls, each located at a different landing, a start control, and car actuating and stopping mechanism responsive to the stop controls operated to stop the car at the landings for which the stop controls are operated and to said start control after each and every stop to start the car.

25. A control system for an elevator car comprising, a plurality of stop switches within the car, one for each of a plurality of landings, a plurality of additional stop switches, one located at each of said landings, start control switching mechanism, and car actuating and stopping mechanism responsive to said stop switches within the car and said stop switches at the landings to stop the car at the landings corresponding to the switches operated and to said start control switching mechanism after each and every stop to start the car.

26. A control system for an elevator car comprising, a plurality of stop controls, each for a different landing, for controlling only the stopping of the car, start control means, and car actuating and stopping mechanism responsive to said stop controls to stop the car only at the landings for which stop controls are operated and to said start control means to start the car in either direction.

27. A control system for an elevator car of the type wherein the starting of the car after each stop is under the control of the operator of the car, characterized by the fact that in addition control means is provided for a landing for causing the stopping of the car only at said landing.

28. A control system of the type wherein an elevator car is driven by means of power mechanism and wherein the power mechanism is caused to stop the car at a landing in response to the operation of a switch located at said landing, characterized by the fact that means are provided only in the car for causing the operation of the power mechanism to start the car.

29. A control system of the type wherein an elevator car is driven by means of power mechanism and wherein the power mechanism is caused to stop the car at a landing in response to the operation of either a switch within the car or a switch at the landing, characterized by the fact that means are provided only in the car for causing the operation of the power mechanism to start the car.

30. A control system for an elevator car comprising, a start control, a stop control for a landing for controlling only the stopping of the car, and car actuating and stopping mechanism responsive to said start control to start the car and to said stop control to stop the car only at said landing regardless of the relative order in which said controls are operated.

31. A control system for an elevator car comprising, means for stopping the car from either direction at a predetermined point, and means for stopping the car from only one direction at said point.

32. A control system for an elevator car comprising, a plurality of stop controls, each for a different landing, a start control, and car actuating and stopping mechanism responsive to said stop controls to stop the car at the landings for which stop controls are operated, only when the car is traveling in a certain direction, and to said start control to start the car.

33. A control system for an elevator car comprising, a pair of directional stop controls for a landing, a start control, and car actuating and stopping mechanism responsive to said start control to start the car and to one of said stop controls to stop the car at said landing only when the car is traveling in one direction and to the other of said stop controls to stop the car at said landing only when the car is traveling in the other direction.

34. A control system for an elevator car comprising, a plurality of switches, one for each of a plurality of landings, operable to cause the stopping of the car at the landings for which said switches are operated upon its approaching said landings in the down direction, a plurality of additional switches, one for each of said landings, operable to cause the stopping of the car at the landings for which said additional switches are operated upon its approaching said landings in the up direction, switching mechanism, said switching mechanism being operable to cause the starting of the car from each and every landing.

35. A control system for an elevator car comprising, a plurality of sets of switches, each set comprising a switch for each of a plurality of landings, the switches of each set being operable to cause the stopping of the car at the respective landings upon its approaching said landings in the down direction, and a plurality of additional sets of switches, each additional set comprising a switch for each of said landings, the switches of each additional set being operable to cause the stopping of the car at the respective landings upon its approaching said landings in the up direction.

36. A control system for an elevator car comprising, a plurality of sets of switches, each set comprising a switch for each of a plurality of landings, the switches of each set being operable to cause the stopping of the car at the respective landings upon its approaching said landings in the down direction, a plurality of additional sets of switches, each additional set comprising a switch for each of said landings, the switches for each additional set being operable to cause the stopping of the car at the respective landings upon its approaching said landings in the up direction, and switching mechanism, said switching mechanism being operable to cause the starting of the car from each and every landing.

37. A control system for an elevator car comprising, a plurality of up switches within the car, one for each of a plurality of landings, and a plurality of up switches without the car, one at each of said landings, both the up switches within the car and the up switches without the car being operable to cause the stopping of the car at the respective landings upon its approaching said landings in the up direction; a plurality of down switches within the car, one for each of said landings, and a plurality of down switches without the car, one at each of said landings, both the down switches within the car and the down switches without the car being operable to cause the stopping of the car at the respective landings upon its approaching said landings in the down direction; and switching mechanism within the car, said switching mechanism being operable to cause the starting of the car from each and every landing in either direction.

38. A control system for an elevator car comprising, a plurality of control means, one for each of a plurality of landings, a plurality of additional control means, one for each of said landings, and means responsive to the control means operated for causing the stopping of the car at the landings, for which the first named control means are operated, in the order of succession of landings for one direction of travel and the stopping of the car at the landings, for which the additional control means are operated, in the order of succession of landings for the other direction of travel, regardless of the order in which the control means are operated.

39. A control system for an elevator car comprising, a switch for each of a plurality of landings, another switch for each of said landings, and means responsive to the operation of the switches for causing the car to stop at the landings, corresponding to the first named switches operated, in the order of succession of landings for one direction of travel and to stop at the landings, corresponding to the second named switches operated, in the order of succession of landings for the other direction of travel, regardless of the order in which the switches are operated and regardless of the position of the car or its direction of travel when the switches are operated.

40. A control system for an elevator car comprising a plurality of stop switches, one for each of a plurality of landings, a plurality of additional stop switches, one for each of said landings, start control switching mechanism and car actuating and stopping mechanism responsive to the first named stop switches to stop the car at the landings corresponding to said first named stop switches operated, only when the car is traveling in one direction, responsive to said additional stop switches to stop the car at the landings corresponding to said additional stop switches operated, only when the car is traveling in the other direction and responsive to said start control switching mechanism to start the car.

41. A control system for an elevator car comprising, a plurality of stop switches, one for each of a plurality of landings, a plurality of additional stop switches, one for each of said landings, start control switching mechanism, car actuating and stopping mechanism responsive to the first named stop switches to stop the car at the landings corresponding to said first named stop switches operated, only when the car is traveling in one direction, responsive to said additional stop switches to stop the car at the landings corresponding to said additional stop switches operated, only when the car is traveling in the other direction, and responsive to said start control switching mechanism to start the car, and means for preventing the operation of the car actuating and stopping mechanism to stop the car in response to the first named stop switches when the car is traveling in said other direction and in response to said additional stop switches when the car is traveling in said one direction.

42. A control system for an elevator car comprising, means for stopping the car at a landing, a switch operable to cause the operation of the stopping means when the car is traveling in one direction, another switch operable to cause the operation of the stopping means when the car is traveling in the other direction, and means for preventing the operation of the stopping means in response to the operation of the first named switch when the car is traveling in the second named direction and in response to the operation of the second named switch when the car is traveling in the first named direction.

43. A control system for an elevator car comprising, a switch for causing the starting of the car after every stop, a plurality of control means, one for each of a plurality of landings, operable to cause the stopping of the car at the landings for which control means have been operated, regardless of when the control means are operated.

44. A control system for an elevator car comprising, means for stopping the car at a landing, means for causing the operation of the first named means, and means for permitting the operation of the first named means in response to the operation of the second named means to stop the car at said landing or for preventing the operation of the first named means in response to the operation of the second named means while allowing the car to continue past said landing without stopping.

45. A control system for an elevator car comprising, stop control means for causing the stopping of the car only at a landing, and additional control means for causing the starting of the car and for permitting the stopping of the car at said landing in response to the first named control means or for preventing the stopping of the car in response to said first named control means while allowing the car to continue past said landing without stopping.

46. A control system for an elevator car comprising, a stop control for a landing, start and stop control switching mechanism, and car actuating and stopping mechanism responsive to said stop control to stop the car only at said landing and to said start and stop control switching mechanism to start the car and to stop it any point.

47. A control system for an elevator car comprising, stop control means for causing the stopping of the car only at a landing, and additional control means for causing the starting of the car, for causing the stopping of the car at any point and for permitting the stopping of the car at said landing in response to the first named control means or for preventing the stopping of the car in response to said first named control means while allowing the car to continue past said landing without stopping.

48. A control system for an elevator car comprising, a stop switch for a landing, start control switching mechanism provided with manual operating means, car actuating and stopping mechanism responsive to said stop switch to stop the car at said landing and to said start control switching mechanism to start the car in either direction, and means for enabling the return of said manual operating means to neutral position without interrupting the running of the car.

49. A control system for an elevator car comprising, a plurality of stop controls, each for a different landing, start control switching mechanism provided with manual operating means, car actuating and stopping mechanism responsive to said stop controls to stop the car only at the landings for which stop controls are operated and to said start control switching mechanism to start the car after each and every stop, and means for enabling the return of said manual operating means to neutral position without interrupting the running of the car.

50. A control system for an elevator car comprising, a stop control for a landing, start control switching mechanism provided with operating means, car actuating and stopping mechanism responsive to said start control switching mechanism to start the car and to said stop control to stop the car at said landing, and means for preventing the operation of said car actuating and stopping mechanism to stop the car at said landing in response to the operation of said stop control, said last named means comprising said operating means.

51. A control system for an elevator car comprising, a plurality of control means, one located at each of a plurality of floors, and means responsive to the operation of said control means for stopping the car at the floors, for which control means are operated, in the natural order of floors, though said control means are operated out of said order.

52. A control system for an elevator car comprising, a plurality of stop switches, each located at a different floor, and means responsive to the operation of said switches for stopping the car at the floors corresponding to the switches operated in the natural order of floors, though said switches are operated out of said order.

53. A control system for an elevator car comprising, a plurality of switches, one located at each of a plurality of floors, and means for starting the car in the up direction and for stopping it at the floors above the car, corresponding to the switches operated, in the natural order of floors in the up direction, regardless of the order in which the switches are operated.

54. A control system for an elevator car comprising, a plurality of switches, one located at each of a plurality of floors, and means for starting the car in the down direction and for stopping it at the floors below the car, corresponding to the switches operated, in the natural order of floors in the down direction, regardless of the order in which the switches are operated.

55. A control system for an elevator car comprising, a plurality of up stop switches, one for each of a plurality of landings, and means responsive to said stop switches for stopping the car at the landings corresponding to the switches operated, only when the car is traveling in the up direction, in the natural order of landings in the up direction, regardless of the order in which said switches are operated.

56. A control system for an elevator car comprising, a plurality of down stop switches, one for each of a plurality of landings, and means responsive to said stop switches for stopping the car at the landings corresponding to the switches operated, only when the car is traveling in the down direction, in the natural order of landings in the down direction, regardless of the order in which said switches are operated.

57. A control system for an elevator car comprising, a plurality of stop controls, one for each of a plurality of landings, start control means, and car actuating and stopping mechanism responsive to said stop controls to stop the car at the landings for which the stop controls are operated, in the natural order of landings, though said stop controls are operated out of said order, and responsive to said start control means to start the car after each and every stop.

58. A control system for an elevator car comprising, a plurality of stop controls carried by the car, one for each of a plurality of landings, a start control also carried by the car and separate from said stop controls, and car actuating and stopping mechanism responsive to said stop controls to stop the car at the landings for which the stop controls are operated, in the natural order of landings, though said stop controls are operated out of said order, and responsive to said start control to start the car after each and every stop.

59. A control system for an elevator car comprising, a plurality of stop controls, one located at each of a plurality of landings, a start control carried by the car, and car actuating and stopping mechanism responsive to said stop controls to stop the car at the landings for which the stop controls are operated, in the natural order of landings, though said stop controls are operated out of said order, and responsive to said start control to start the car after each and every stop.

60. A control system for an elevator car comprising, a plurality of control means, one located at each of a plurality of landings, and means operable by car movement for causing the stopping of the car at the landings, for which control means are operated, in the natural order of landings, though said control means are operated out of said order.

61. A control system for an elevator car comprising, a plurality of control means, one located at each of a plurality of landings, each control means being operable at any time to cause the stopping of the car at the landing for which said each control means is operated, upon the first approach of the car to said landing from one direction.

62. A control system for an elevator car comprising, a plurality of control means carried by the car, one for each of a plurality of floors, a plurality of additional control means, one located at each of said floors, and means responsive to the operation of said control means, both carried by the car and located at the floors, for stopping the car at the floors for which the control means are operated regardless of the position of the car when the control means are operated.

63. A control system for an elevator car comprising, a plurality of stop switches carried by the car, one for each of a plurality of floors, a plurality of additional stop switches, one located at each of said floors, and means responsive to the operation of said switches, both carried by the car and located at the floors, for stopping the car at the floors corresponding to the switches operated regardless of the position of the car when the switches are operated.

64. A control system for an elevator car comprising, a plurality of stop switches, one for each of a plurality of landings, a plurality of additional stop switches, one for each of said landings, and means responsive to the first named switches to stop the car at the landings corresponding to the first named switches operated, only when the car is traveling in one direction, and to the additional switches to stop the car at the landings corresponding to the additional switches operated, only when the car is traveling in the other direction, regardless of the direction of travel of the car when the various first named switches and additional switches are operated.

65. A control system for an elevator car comprising, a plurality of stop switches, one for each of a plurality of landings, a plurality of additional stop switches, one for each of said landings, and means responsive to the first named switches to stop the car at the landings corresponding to the first named switches operated, only when the car is traveling in one direction, and to the additional switches to stop the car at the landings corresponding to the additional switches operated, only when the car is traveling in the other direction, regardless of the position of the car when the various first named and additional switches are operated or the relative order in which the various first named and additional switches are operated.

66. A control system for an elevator car comprising, a plurality of stop switches, one for each of a plurality of landings, a plurality of additional stop switches, one for each of said landings, and means responsive to the first named switches to stop the car at the landings corresponding to the first named switches operated, only when the car is traveling in one direction, and to the additional switches to stop the car at the landings corresponding to the additional switches operated, only when the car is traveling in the other direction, regardless of the position of the car when the various first named and additional switches are operated or the time that the various first named and additional switches are operated.

67. A control system for an elevator car comprising, a plurality of control means without the car, one for each floor, a plurality of control means within the car, one for each floor, and means responsive to all the control means operated for causing the stopping of the car at the floors for which control means are operated, regardless of when the control means are operated.

68. A control system for an elevator car comprising, a plurality of control means without the car, one for each floor, a plurality of control means within the car, one for each floor, and means responsive to all the control means operated for causing the stopping of the car at the floors, for which control means are operated, in the natural order of floors, though said control means are operated out of said order.

In testimony whereof, I have signed my name to this specification.

HUMPHREY F. PARKER.

DISCLAIMER

Reissue No. 16,297.—*Humphrey F. Parker*, Philadelphia, Pa. CONTROL FOR ELECTRIC ELEVATORS. Patent dated March 23, 1926. Disclaimer filed May 1, 1931, by the assignee, *Otis Elevator Company*.

Hereby enters this disclaimer to claims 34, 35, 36, and 37 in said patent, which are in the following words, to-wit:

"34. A control system for an elevator car comprising a plurality of switches, one for each of a plurality of landings, operable to cause the stopping of the car at the landings for which said switches are operated upon its approaching said landings in the down direction, a plurality of additional switches, one for each of said landings, operable to cause the stopping of the car at the landings for which said additional switches are operated upon its approaching said landings in the up direction, switching mechanism, said switching mechanism being operable to cause the starting of the car from each and every landing.

"35. A control system for an elevator car comprising, a plurality of sets of switches, each set comprising a switch for each of a plurality of landings, the switches of each set being operable to cause the stopping of the car at the respective landings upon its approaching said landings in the down direction, and a plurality of additional sets of switches, each additional set comprising a switch for each of said landings, the switches of each additional set being operable to cause the stopping of the car at the respective landings upon its approaching said landings in the up direction.

"36. A control system for an elevator car comprising, a plurality of sets of switches, each set comprising a switch for each of a plurality of landings, the switches of each set being operable to cause the stopping of the car at the respective landings upon its approaching said landings in the down direction, a plurality of additional set of switches, each additional set comprising a switch for each of said landings, the switches for each additional set being operable to cause the stopping of the car at the respective landings upon its approaching said landings in the up direction, and switching mechanism, said switching mechanism being operable to cause the starting of the car from each and every landing.

"37. A control system for an elevator car comprising, a plurality of up switches within the car, one for each of a plurality of landings, and a plurality of up switches without the car, one at each of said landings, both the up switches within the car and the up switches without the car being operable to cause the stopping of the car at the respective landings upon its approaching said landings in the up direction; a plurality of down switches within the car, one for each of said landings, and a plurality of down switches without the car, one at each of said landings, both the down switches within the car and the down switches without the car being operable to cause the stopping of the car at the respective landings upon its approaching said landings in the down direction; and switching mechanism within the car, said switching mechanism being operable to cause the starting of the car from each and every landing in either direction."

[*Official Gazette May 19, 1931.*]